(12) United States Patent
Kakutani

(10) Patent No.: US 6,320,950 B1
(45) Date of Patent: Nov. 20, 2001

(54) COMMUNICATION CONTROL UNIT HAVING A FREE DIAL AND COLLECT CALL FUNCTION BY UTILIZING CALLER ID SIGNALS

(75) Inventor: Masaki Kakutani, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/057,535

(22) Filed: Apr. 9, 1998

(30) Foreign Application Priority Data

Apr. 15, 1997 (JP) .................................................. 9-097448

(51) Int. Cl.⁷ ......................... H04M 3/42; H04M 15/06; H04M 17/00
(52) U.S. Cl. .............. 379/210.01; 379/114.24; 379/142.01; 379/144.02
(58) Field of Search ..................................... 379/111, 114, 379/118, 120, 121, 127, 130, 140, 141, 142, 144, 154, 157, 158, 201, 207, 209, 219, 220, 114.21, 114.24, 121.01, 127.01, 142.01, 144.02, 201.01, 209.01, 210.01, 220.01

(56) References Cited

U.S. PATENT DOCUMENTS 6,009,155 * 12/1999 Adachi .................................. 379/142

FOREIGN PATENT DOCUMENTS 0 802 663-A2 * 10/1997 (EP) ............................... H04M/3/48

* cited by examiner

Primary Examiner—Harry S. Hong
(74) Attorney, Agent, or Firm—Frishauf, Holtz, Goodman, Langer & Chick, P.C.

(57) ABSTRACT

In a communication control unit, CPU judges whether a telephone number of a caller is included in caller ID signals and communicating section starts communicating with the caller when the CPU judges that the telephone number of the caller is not included in the caller ID signals; or calls back the telephone number of the caller when the CPU judges that the telephone number of the caller is included in the caller ID signals.

15 Claims, 14 Drawing Sheets

FIG. 2

| CALLED RESPONSE MODE SETTING 21 | PRESENCE OF AREA CODE CHECKING IN FREE DIAL MODE 22 | AREA CODE REGISTRATION TABLE 23 |
|---|---|---|
| 0: NORMAL MODE<br>1: COLLECT CALL MODE<br>2: FREE DIAL MODE | 0: NO<br>1: YES | 03<br>⋮<br>0426 |

20 CALLED RESPONSE MODE SETTING STORAGE SECTION

FIG. 3

| NO. 31 | TELEPHONE NUMBER 32 | NAME 33 | CALLING MODE SETTING 0: NORMAL MODE 1: COLLECT CALL MODE 34 | CALLED MODE SETTING 0: NORMAL MODE 1: CALL BACK MODE 35 |
|---|---|---|---|---|
| 1 | 0123456 | KONICA (CORP.) | 1 | 1 |
| 2 | 0011223 | ABC (CORP.) | 0 | 0 |
| . . . | | | . . . | . . . |
| n | 1234566 | XTZ (CORP.) | 1 | 1 |

30 TELEPHONE NUMBER MEMORY

COMMUNICATION CONTROL UNIT HAVING A FREE DIAL AND COLLECT CALL FUNCTION BY UTILIZING CALLER ID SIGNALS

BACKGROUND OF THE INVENTION

The present invention relates to a communication control unit.

Services such as a free dial and a collect call have recently been put to practical use on terminals employing public networks. The free dial service is one wherein when an unspecified communication terminal communicates with a communication target, communication charges are borne by the communication target while the collect call service is one wherein when a specified communication terminal speaks over the telephone with a communication target, communication charges are borne by the communication target.

In the conventional services stated above, a free dial function and a collect call function have not been owned by terminals but have been owned by switchboards Communication companies, on the other hand, are supposed to start CALLER ID (a caller ID) service wherein an originator number is notified at the moment of arrival, and once this service starts, it is possible for the communication terminal to discriminate originators. In this case, however, the communication terminal owns neither the free dial function nor the collect call function, although it owns a discriminating function.

SUMMARY OF THE INVENTION

With the foregoing as a background, the invention has been achieved and its object is to provide a communication control unit capable of realizing a function corresponding to the free dial function and the collect call function on a communication terminal by utilizing caller ID signals.

The above functions are realized by the following structures.

(1) A communication control unit, comprising:
   a network connection unit to connect public lines in response to an arrival signal sent from a caller;
   communicating means for communicating with the caller through the network connection unit;
   caller ID receiving means to receive caller ID signals of the caller sent from the public lines through the network connection unit;
   control means for judging whether a telephone number of the caller is included in the caller ID signals;
   wherein the communicating means starts communicating with the caller when the control means judges that the telephone number of the caller is not included in the caller ID signals; and calls back the telephone number of the caller when the control means judges that the telephone number of the caller is included in the caller ID signals.

(2) In the communication control unit of Item (1), the control means has a memory to store caller ID data corresponding to the caller ID signals and a central processing unit (3) In the communication control unit of Item (1), the network connection unit disconnects the public lines from the caller after the caller ID receiving means receives the caller ID signals of the caller.

(4) In the communication control unit of Item (2), when the telephone number of the caller is not included in the caller ID signals, the network connection unit connects again the public lines with the caller in response to a next arrival signal from the caller and the communicating means starts communicating with the caller.

(5) In the communication control unit of Item (2), when the telephone number of the caller is included in the caller ID signals, the communicating means calls back the telephone number of the caller after a next arrival signal is not sent from the caller for a predetermined time.

(6) In the communication control unit of Item (1), if a ring-back tone from the caller is detected when communicating means calls back the telephone number of the caller, the communicating means rings a different sound from that of a regular call so that the calling back is notified, and stops the ring-back tone after a signal is sent from the caller.

(7) In the communication control unit of Item (1), the control means controls the communicating means so as to conduct one of plural automatic response modes including a regular response mode, a free-dial mode and a collect call mode.

(8) In the communication control unit of Item (1), in the case of the regular response mode, the communicating means starts communicating with the caller regardless of whether the telephone number of the caller is included in the caller ID signals.

(9) In the communication control unit of Item (1), in the case of the free-dial mode, when the telephone number of the caller is included in the caller ID signals, the communicating means calls back the telephone number of the caller regardless of whether the telephone number of the caller is registered.

(10) In the communication control unit of Item (8), the control means comprises an area memory section to register plural area codes, and wherein in the case of the free-dial mode, the control means compares the area code of the telephone number of the caller with the area codes registered in the area memory section, the communicating means calls back the telephone number of the caller when the area code of the telephone number of the caller is registered in the area memory.

(11) In the communication control unit of Item (2), the control means comprises a telephone number registration memory section to register plural callers, wherein each caller is registered together with a telephone number of the caller and a personal response mode for the caller.

(12) In the communication control unit of Item (9), in the case of the collect call mode, the control means compares the telephone number of the caller with the telephone numbers registered in the telephone number registration memory section, and the communicating means calls back the telephone number of the caller when the telephone number of the caller is registered in the telephone number registration memory section and the personal response mode is the call back mode.

The structure of the invention stated above makes it possible to realize a call back function wherein caller ID signals are received and are judged whether or not an originator number is included in the signals and thereby either an ordinary response for arrival is conducted or the originator number is called back depending on the results of the judgment, which further makes it possible to realize both a free dial function and a collect call function on a communication terminal.

BRIEF DESCRIPTION OF THE DRAWINGS

FIG. 2 is a diagram showing an example of setting a mode for responding to the called in the course of detection of the originator number.

FIG. 3 is a diagram showing an example of the structure of a telephone number registration memory.

DETAILED DESCRIPTION OF THE PREFERRED EMBODIMENT

An embodiment of the invention will be explained in detail as follows with reference to the drawings.

Figure 1:
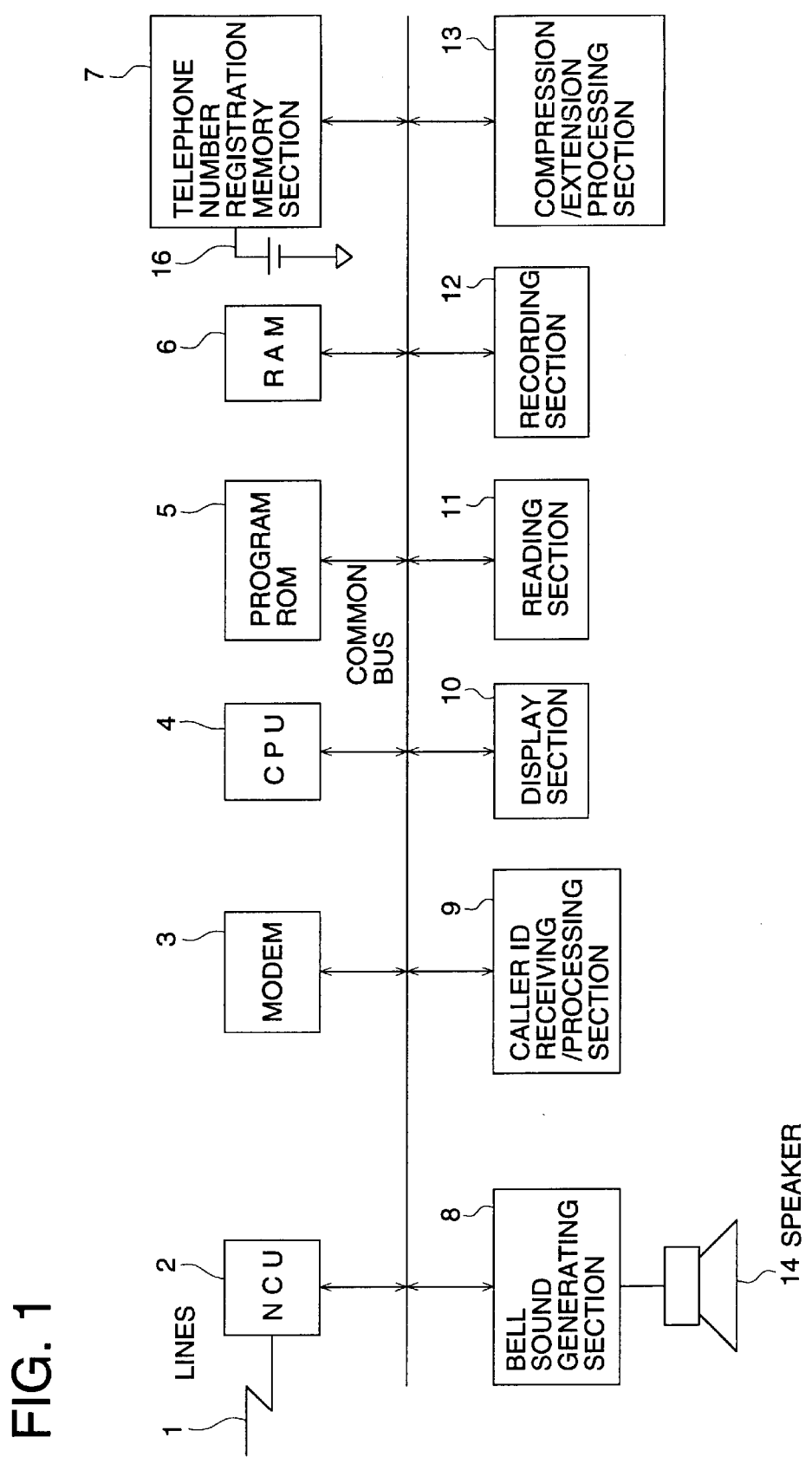
FIG. 1 is a block diagram showing an embodiment of the invention.

FIG. 1 is a block diagram showing an embodiment of the invention, and it shows an occasion wherein the invention is applied to a facsimile telegraph. Hereinafter, a calling communication unit is called a caller. In the drawing, the numeral 1 represents public lines, 2 represents a network connection unit (also called network control unit: NCU), and 3 represents a modem which modulates and demodulates FAX signals and demodulates caller ID signals.

The numeral 4 represents CPU which controls whole operations, 5 represents ROM in which programs for operations are stored, 6 represents RAM which temporarily holds therein various information (for example, caller ID), and 7 represents a telephone number registration memory section in which plural telephone numbers and response modes for the telephone numbers are registered. The telephone number registration memory section 7 is arranged so that information may be stored therein by means of battery 16 even when a power supply is turned off.

The numeral 8 represents a bell sound generating section which generates a bell sound, and 14 represents a speaker driven by the bell sound generating section 8. The numeral 9 is a caller ID receiving/processing section which conducts deframing of caller ID data demodulated by a modem, then detects whether or not an originator number is included, and extracts the originator number if it is included, and 10 represents a display section which displays contents of caller ID. The numeral 11 is a reading section which reads in formation on a document, 12 is a recording section which records received facsimile information on a recording sheet, and 13 is a compression/extension section which compresses transmission signals and extends (demodulates) received signals. A common bus which connects each structural element is represented by 15.

Due to the structure of the invention stated above, it is possible to realize a call back function wherein caller ID signals are received, then judgment is made whether the caller ID signals include an originator number or not, and an ordinary response for the arrival is conducted or the originator number received is dialed back, depending on the results of the judgment, thus a free dial function and a collect call function can be realized on communication terminals.

FIG. 2 is a diagram showing an example of setting a mode for responding to the called in the course of detection of the originator number, and it shows the structure of the called response mode setting storage section 20. The numeral 21 is a called mode setting section which is divided into 0 (normal mode), 1 (collect call mode) and 2 (free dial mode). The normal mode in this case is a mode to respond automatically independently of the originator number. The collect call mode is a mode wherein originator numbers are registered in telephone number registration memory section 7, and call back is conducted when the called response mode is set to the call back. The free dial mode is one wherein which conducts call back unconditionally when originators numbers are sent thereto.

Next, the numeral 22 represents an area where the presence of checking of area codes in the case of a free dial mode is set, and it is determined that "0" represents the presence of checking and "1" represents no presence of checking. The numeral 23 is an area code registration table section wherein area codes such as, for example, "03" . . . "0426" are registered as shown in the drawing. This called response mode setting storage section 20 is stored in telephone number registration memory section 7.

FIG. 3 is a diagram showing an example of the structure of telephone number registration memory 30 in the telephone number registration memory section 7. The numeral 31 is an abbreviated number section, 32 is a telephone number section, 33 is a name section of the corresponding telephone number, 34 is a calling mode setting section, and 35 is a called setting mode section. When the calling mode setting section 34 is "0", it represents a normal mode, while when it is "1", it represents a collect call mode. When the called mode setting section 35 is "0", it represents a normal mode, while when it is "1", it represents a call back mode. These information are stored in the telephone number registration memory section 7. Data shown in FIGS. 2 and 3 are those which are to be registered in an unit by an operator in advance. Operations of the unit structured as stated above will be explained as follows.

Figure 4:
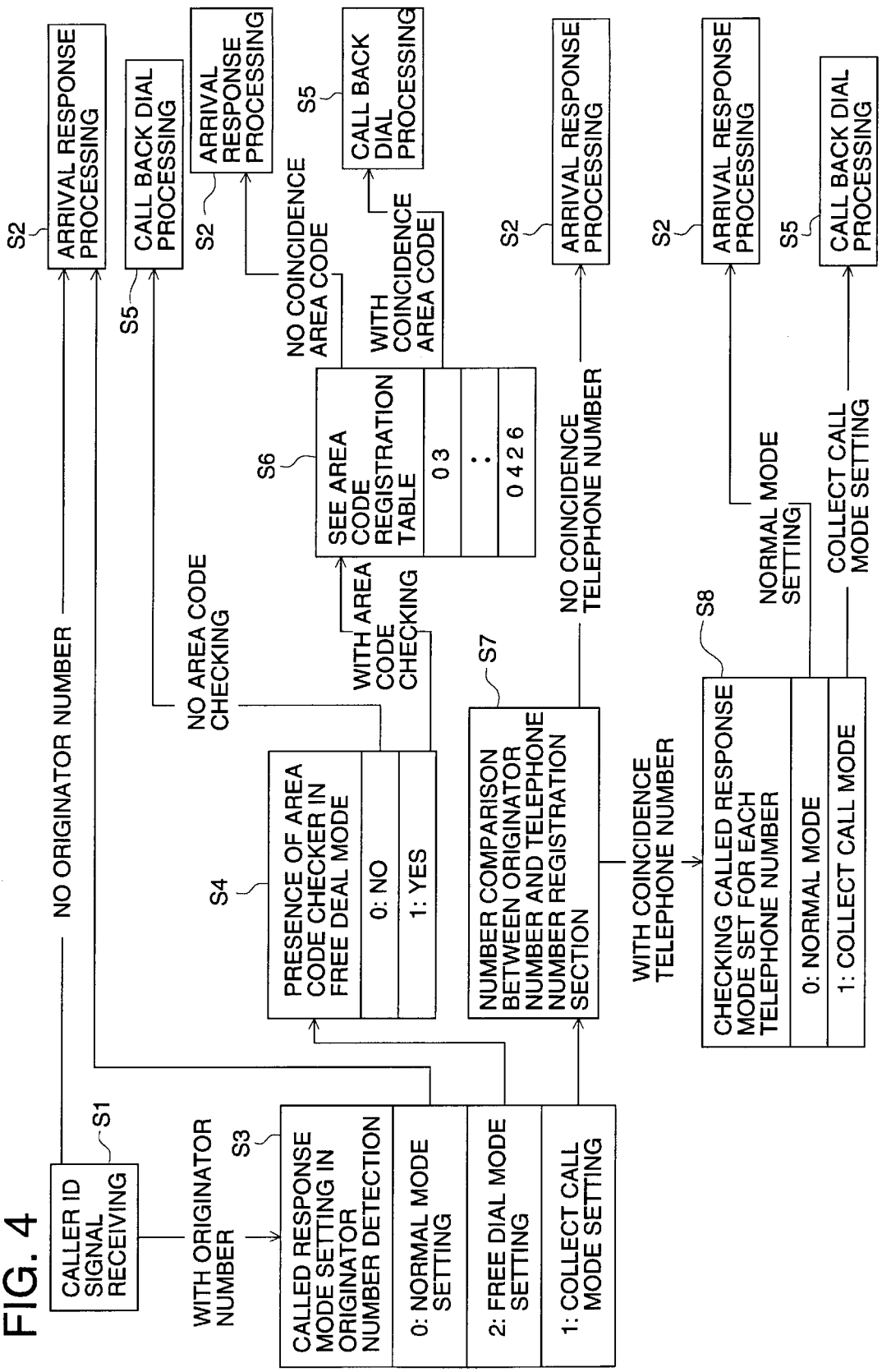
FIG. 4 is a diagram showing an example of a sequence for determining a mode for responding to the called.

FIG. 4 is a diagram showing an example of a sequence for determining a mode for responding to the called. Upon receiving of caller ID signals, CPU 4 checks whether an originator number is included in the caller ID signals or not (S1). When the originator number is not included, normal arrival response processing is conducted (S2).

When the originator number is included, CPU 4 checks whether the mode is a normal mode, a free dial mode or a collect call mode, referring to the called response mode setting storage section 20 (S3).

In the case of "0" which represents normal mode setting, normal arrival response processing is conducted (S2). In the case of "2", which represents a free dial mode, CPU 4 judges whether the area code check is required or not, referring to area code check area 22 (S4). In the case of "0" which represents no area code check, call back dial processing is conducted (S5). In the case of "11" which represents the presence of area code check, CPU 4 refers to area code registration table section 23 (S6).

When there is no coincidence code in reference to the area code registration table section 23, normal arrival response processing is conducted (S2). When there is a coincidence code, call back dial processing is conducted (S5).

Next, when the called response mode is "1" which represents a collect call mode, CPU 4 compares an originator number with a telephone number stored in telephone number registration memory 30 (S7). When there is no coincidence telephone number, arrival response processing is conducted (S2).

When there is a coincidence telephone number, CPU 4 checks a called response mode established for each telephone number (S8). When called mode setting section 35 is "0" which represents normal mode setting, normal arrival response processing is conducted (S2), while when it is "1" which represents a collect call mode, call back dial processing is conducted (S5).

Figure 5:
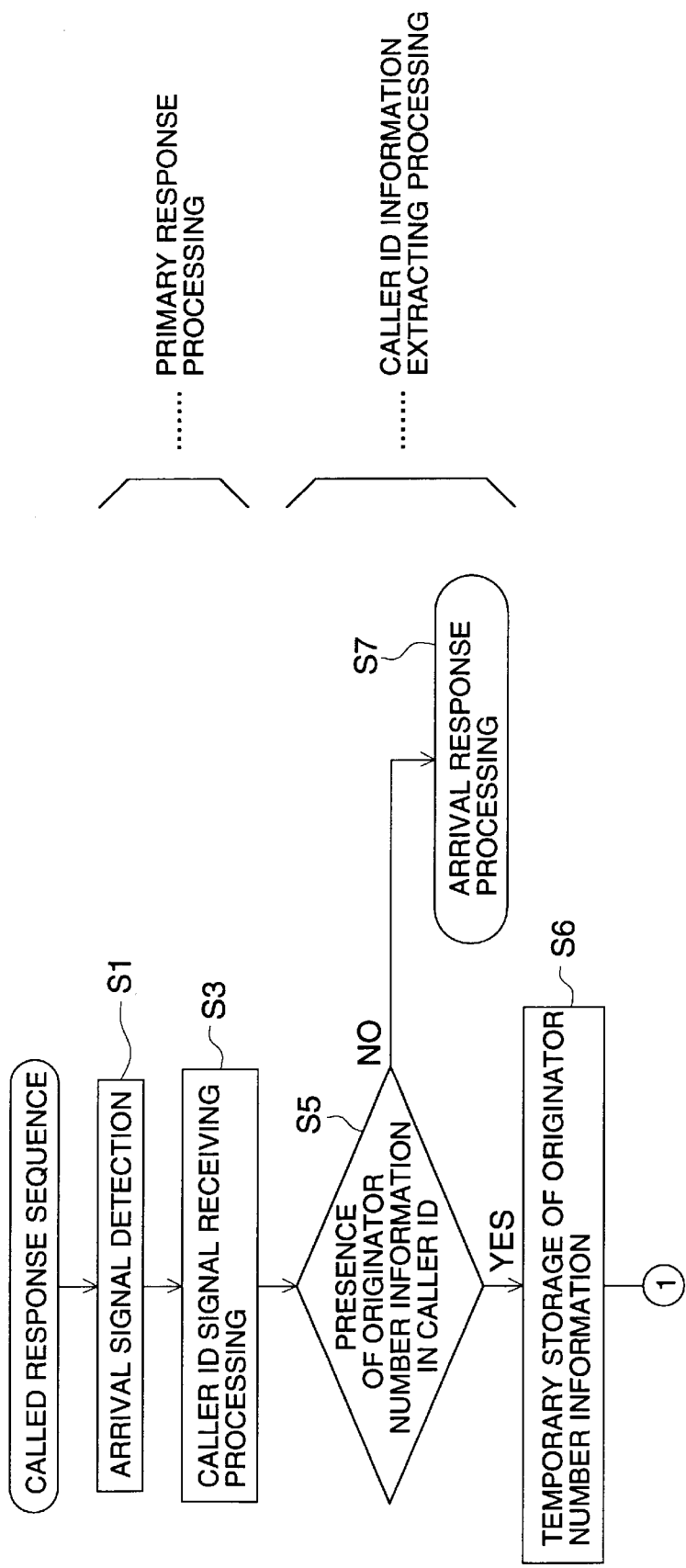
FIG. 5 is a flow chart showing an example of a sequence of a mode for responding to the called.
Figure 6:
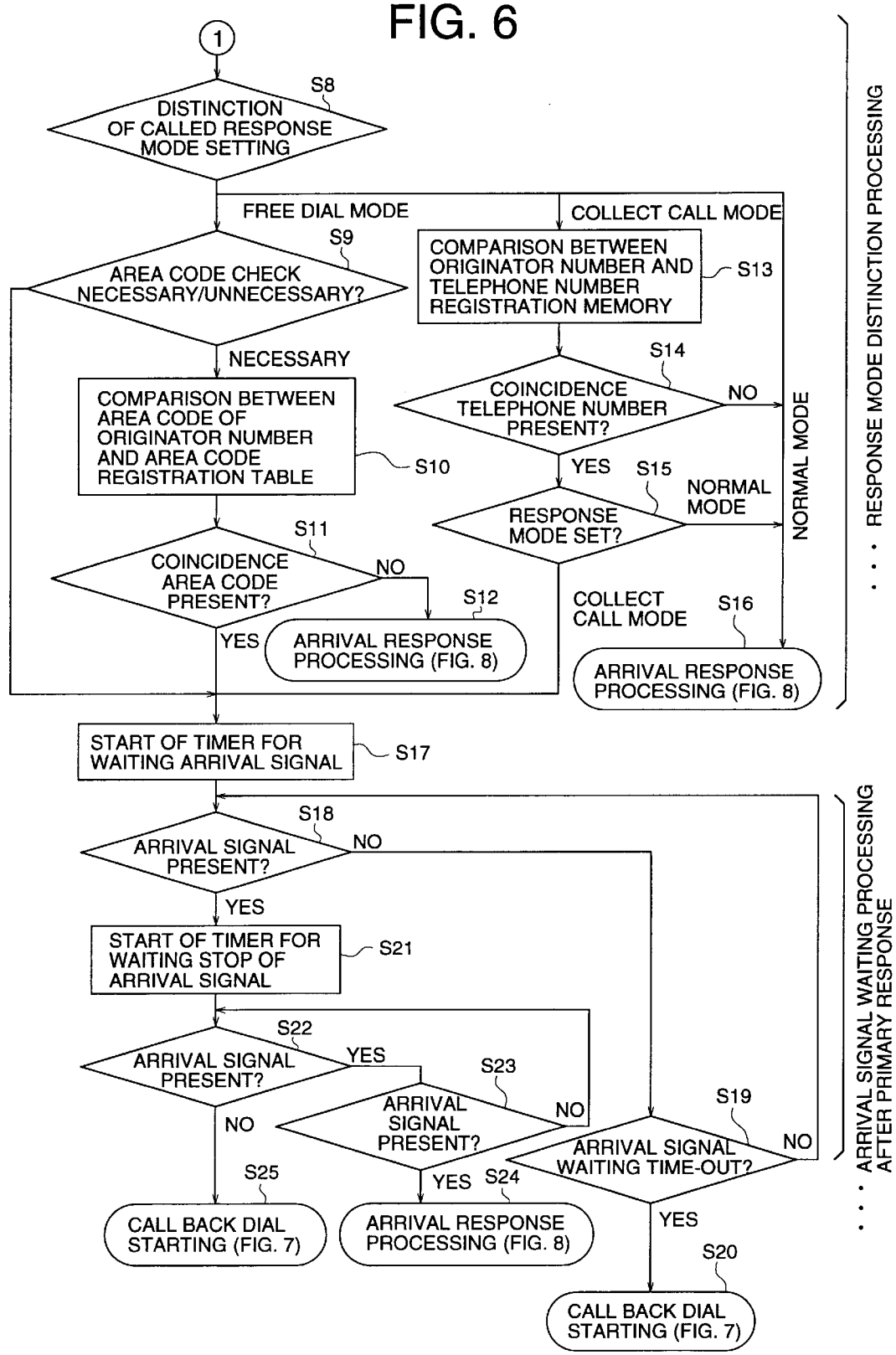
FIG. 6 is a flow chart showing an example of a sequence of a mode for responding to the called.

Each of FIGS. 5 and 6 is a flow chart showing an example of a called response sequence. When an arrival signal (ring signal) is inputted through public lines 1, CPU 4 detects the arrival signal (S1).

Next, CPU 4 conduct processing for receiving caller ID signals sent from a switchboard (S3). In the processing for receiving caller ID, caller ID signals are demodulated by a modem, and demodulated caller ID signal data are deframed by caller ID receiving processing section 9, whereby caller ID data are extracted. Contents of the extracted caller ID are analyzed on display section 10 to be indicated.

Caller ID signals received are demodulated by modem 3. CPU 4 checks whether an originator number is included in the demodulated caller ID signals or not (S5). When the originator number is not included, CPU 4 keeps waiting arrival signals and conducts normal arrival response processing (S7). When the originator number is included, CPU 4 makes RAM 6 to store the originator number temporarily (S6). Steps S5–S7 represent caller ID information extracting processing.

Next, CPU 4 conducts discrimination of called response mode setting with reference to telephone number registration memory section 7 (S8). The called response modes are discriminated with reference to called response mode setting section 21 in called response mode setting storage section 20. In other words, a normal mode is represented by a value of "0", a collect call mode is represented by "1" and a free dial mode is represented by "2", all values being those of the called response mode setting section 21.

Figure 8:
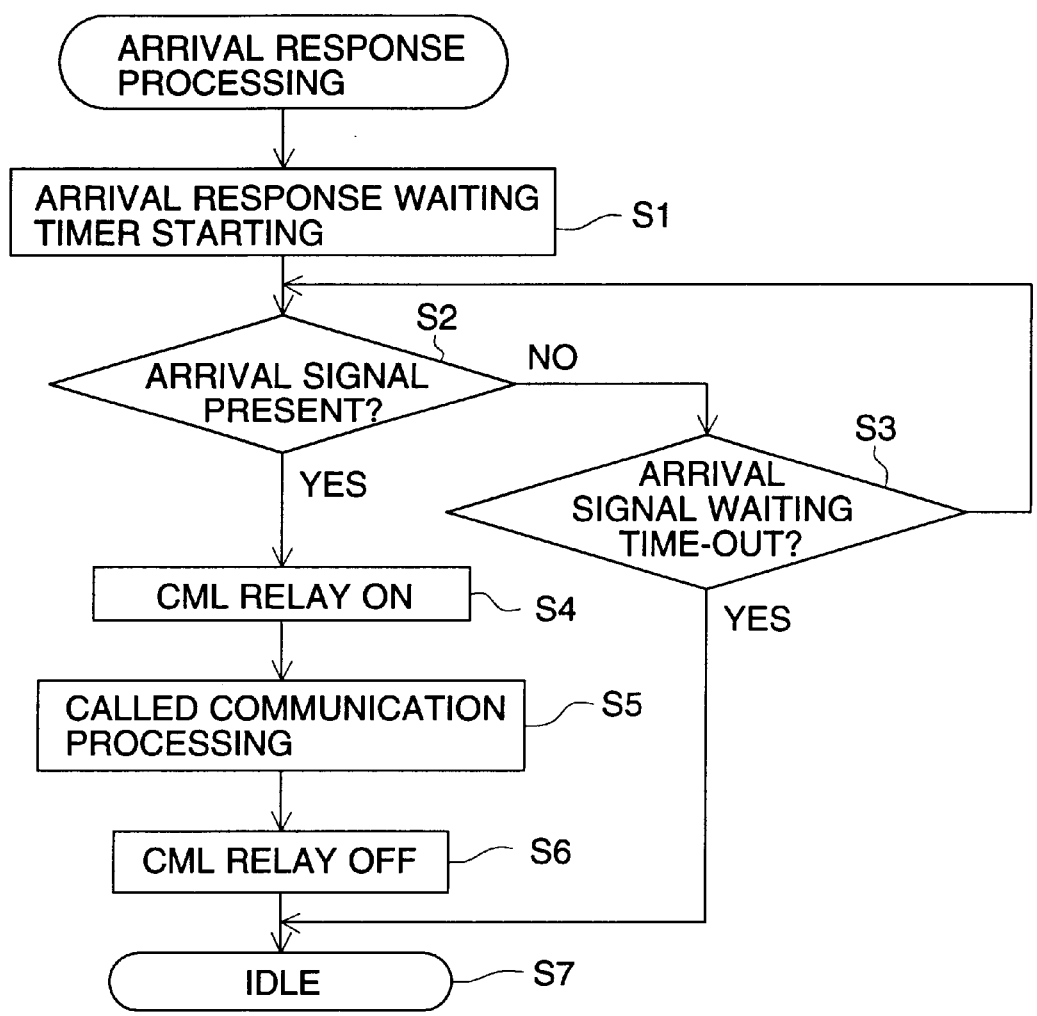
FIG. 8 is a flow chart showing an example of the response to arrival.

First, the occasion wherein the called response mode is a normal mode will be explained. In this case, ordinary arrival response processing (described in detail later) shown in FIG. 8 is conducted (S16). Next, the occasion wherein the called response mode is a free dial mode will be explained. In the case of a free dial mode, CPU 4 judges whether the area code check is required or not with reference to area code check area 22 (S9). If the area code check area 22 is "0", it means that area code check is not required. Therefore, the sequence skips to S 17.

When the area code check area is "1", CPU 4 compares an area code included in originator numbers with an area code registered in area code registration table section 23 (S10), and it checks whether there is a coincidence area code or not (S11). When there is no coincidence area code, ordinary arrival response processing shown in FIG. 8 (described later) is conducted (S12). When there is a coincidence area code, arrival signals after primary response are waited.

Next, the occasion wherein the called response mode is a collect call mode will be explained. In the case of the collect call mode, CPU 4 refers to telephone number registration memory section 7, and compares between originator numbers and telephone numbers (dial numbers) stored in telephone number registration memory 30 by referring to them (S13), and checks whether there is a telephone number coinciding to the originator number or not (S14). When there is no coincidence number, ordinary arrival response processing shown in FIG. 8 is conducted (S16).

When there is a coincidence telephone number, CPU 4 checks what the response mode is (S15). When data registered in called mode setting section 35 is "0" which represents a normal mode, ordinary arrival response processing shown in FIG. 8 is conducted (S16). When data registered in called mode setting section 35 is "1", it represents a collect call mode. Steps S8–S16 represent response mode discrimination processing.

In the aforesaid processing, when there is a coincidence with an area code stored in area code registration table section 23 in the case where area code check is not required and in the case where area code check is required, and when the mode is a collect call mode, CPU 4 starts an arrival signal (ring signal) waiting timer (S17), and waits arrival signals for a prescribed period of time. This arrival signal waiting timer can be realized either by a hardware or by a software. Next, the unit enters the state of arrival signal waiting after primary response.

Figure 7:
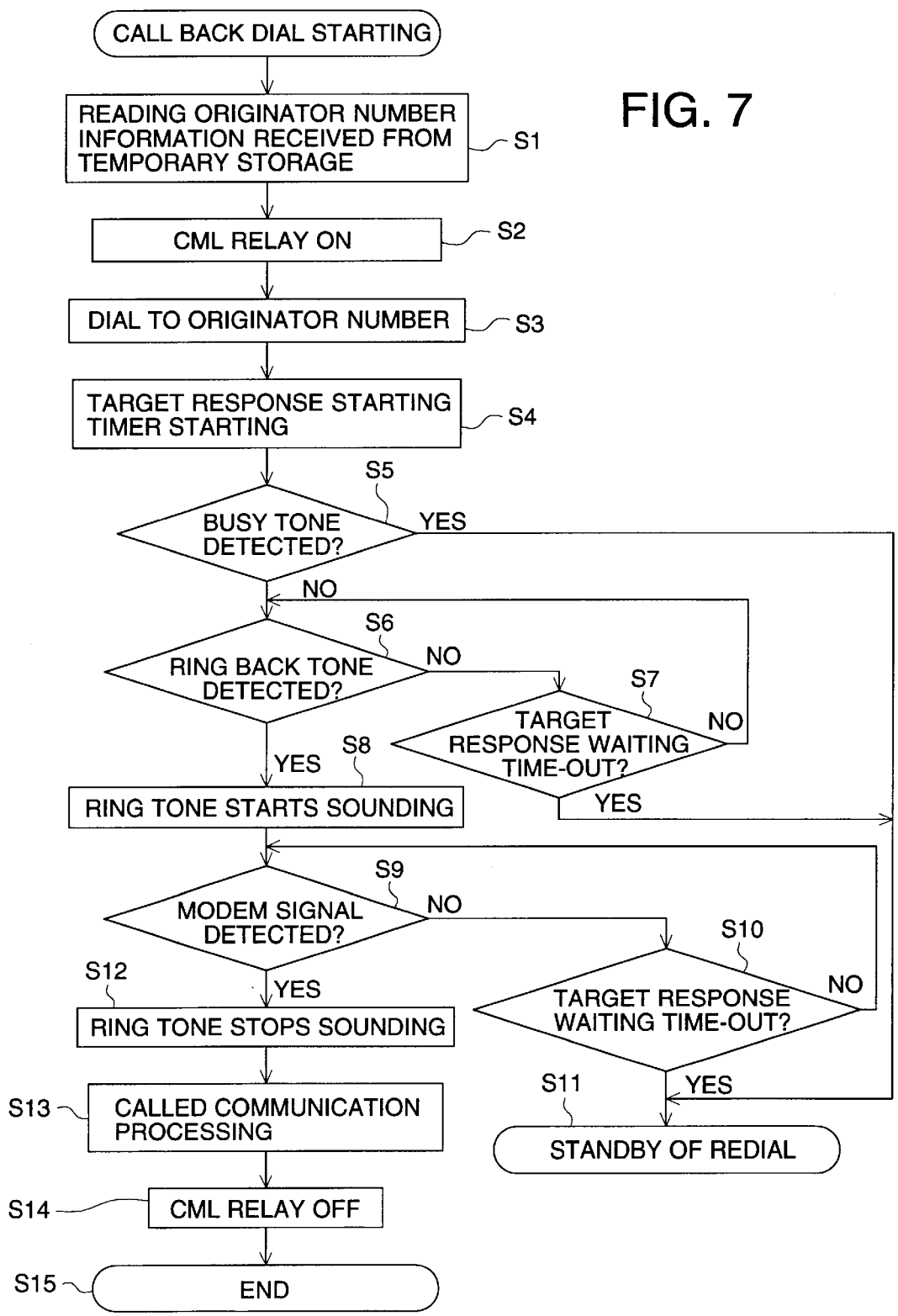
FIG. 7 is a flow chart showing an example of a sequence of call back dial.

When arrival signals are detected before time-out of the arrival signal waiting timer, CPU 4 further starts a arrival signal stop waiting timer (S21), and waits the stop of arrival signals. The arrival signal stop waiting timer can be realized either by a hardware or by a software. When time runs out on the arrival signal waiting timer (S19), CPU 4 judges that a calling station is expecting call back, and starts call back dial (S20). Call back dial start processing is shown in FIG. 7 (which will be stated in detail later).

Even when arrival signals are stopped before time-out of the arrival signal stop waiting timer, a calling station is judged to be expecting call back, and call back dial is started (S25). When arrival signals are not stopped until the moment when time runs out on the arrival signal stop waiting timer (S23), CPU 4 judges that a calling station called on an ordinary calling mode, and it conducts ordinary arrival response processing shown in FIG. 8 (S24). Steps S17–S23 represent arrival signal waiting processing after primary response.

As stated above, the embodiment of the invention makes it possible to select the response of arbitrary mode in advance when a normal mode, a free dial mode and a collect call mode are provided as an automatic response mode in the case of the called.

Further, due to the embodiment of the invention, it is possible to execute call back operations only for the call from a target having a specific area code, by causing the call back operations to be executed only when the area code of the originator number sent agrees with an area code registered in advance.

Therefore, the invention makes it possible to realize a free dial function and a collect call function on communication terminals, by utilizing caller ID signals.

FIG. 7 is a flow chart showing an example of a sequence of call back dial. First, CPU 4 reads an originator number stored in RAM 6 for temporary storage (S1), and turns on CML relay (S2). The CML relay is provided in NCU 2, and it is a relay to connect a modem to lines. When this CML relay is turned on, a DC loop is formed to create a condition which makes it possible to communicate between a switchboard and a communication control unit. Due to this, connection to lines is carried out. Then, CPU 4 dials the originator number which has been read by CPU 4 (S3). After that, CPU 4 starts a response signal waiting timer which waits response signals from a target (S4). This response signal waiting timer can be realized either by a hardware or by a software.

Then, CPU 4 detects whether there is a busy tone or not (S5). The busy tone is a signal indicating "Line's busy" which means that a target is using the line. After the busy tone is detected, lines are disconnected to enter the state of standby for redial (S11). When there is no busy tone, CPU 4 detects whether there is a ring back tone or not (S6). The ring back tone is a calling signal of a target.

If time runs out on a target response waiting timer before the ring back tone is detected, the sequence enters the state of standby for redial (S11). After the ring back tone is detected, CPU 4 starts bell sound generating section 8 of the unit and causes speaker 14 to start sounding its ring tone (S8). In this case, when an ordinary ring tone and a reading sound in step S8 are arranged to be different from each other, an operator can recognize that a ring back tone has been detected.

In the present embodiment, it is possible to recognize call back operations, by sounding a ring tone which is different from an ordinary ring tone after a ring back tone is detected.

Next, CPU 4 judges whether a modem signal has been detected or not (S9). When the modem signal has not been detected, lines are disconnected to enter the state of standby for redial after time runs out on a target response waiting response timer (S11).

Next, when the modem signal is detected, CPU 4 stops the sounding of a ring tone (S12) and conducts called communication processing with a target (S13). In this called communication processing, processing to receive image data from a call back target is to be conducted.

After the called communication processing has been completed, CPU 4 turns off a CML relay to disconnect lines (S14) and completes call back processing (s14).

FIG. 8 is a flow chart showing an example of the response to arrival. First, CPU 4 starts an arrival signal waiting timer (S1). This arrival signal waiting timer can be realized either by a hardware or by a software. After that, CPU 4 checks whether there is an arrival signal or not (S2).

If time runs out on the arrival signal waiting timer before an arrival signal comes, the unit returns to its idle state (initial state) (S7). When there is an arrival signal, CPU 4 turns on a CML relay to connect lines (S4), and conducts communication processing in the called with a target unit (S5). In the case of a facsimile telegraph, the called communication processing is of a procedure to start from transmission of CED/CSI/DIS (see FIG. 12).

After the called communication processing has been completed, CPU 4 turns off the CML relay to disconnect lines (S6) and to return to the idle state.

Figure 9:
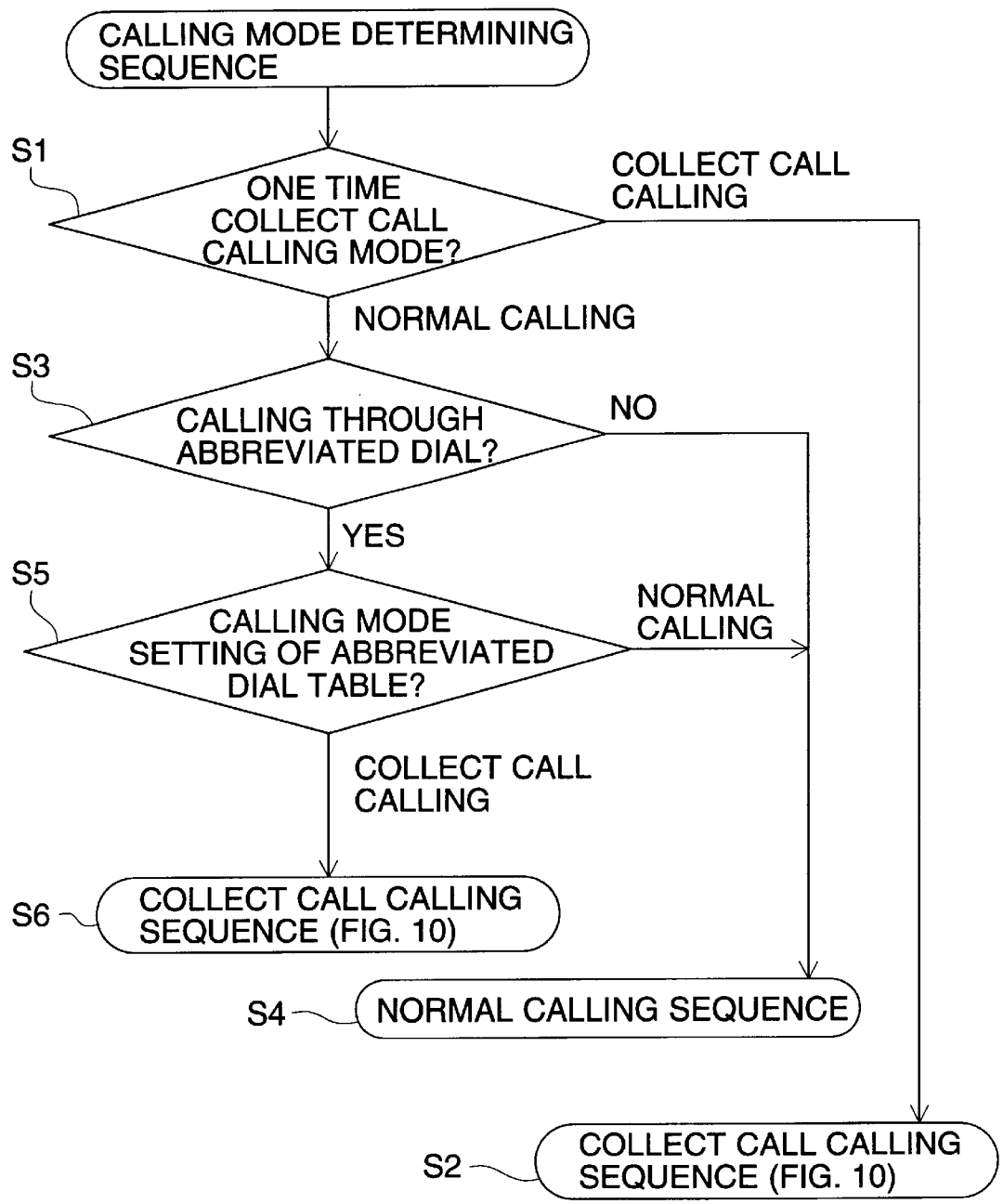
FIG. 9 is a flow chart showing an example of a sequence for judging a calling mode.

Next, a calling sequence on the part of a calling station will be explained. FIG. 9 is a diagram showing an example of a sequence for judging a calling mode. CPU 4 checks the mode whether it is a one time collect call calling mode or not (S1). In this case, in the communication control unit, there is provided a push button switch which selects a collect call mode only once when a button is pressed and selects an ordinary calling mode when a button is not pressed. When CPU 4 detects that the push button has been pushed, the CPU 4 executes a calling sequence for only one collect call shown in FIG. 10 (S2: explained in detail later).

In the case of normal calling in step S1, CPU 4 judges whether calling in an abbreviated dial should be conducted or not (S3). In the case of calling wherein no abbreviated dial is used, the communication control unit on the part of calling executes a normal calling sequence (S4).

Figure 10:
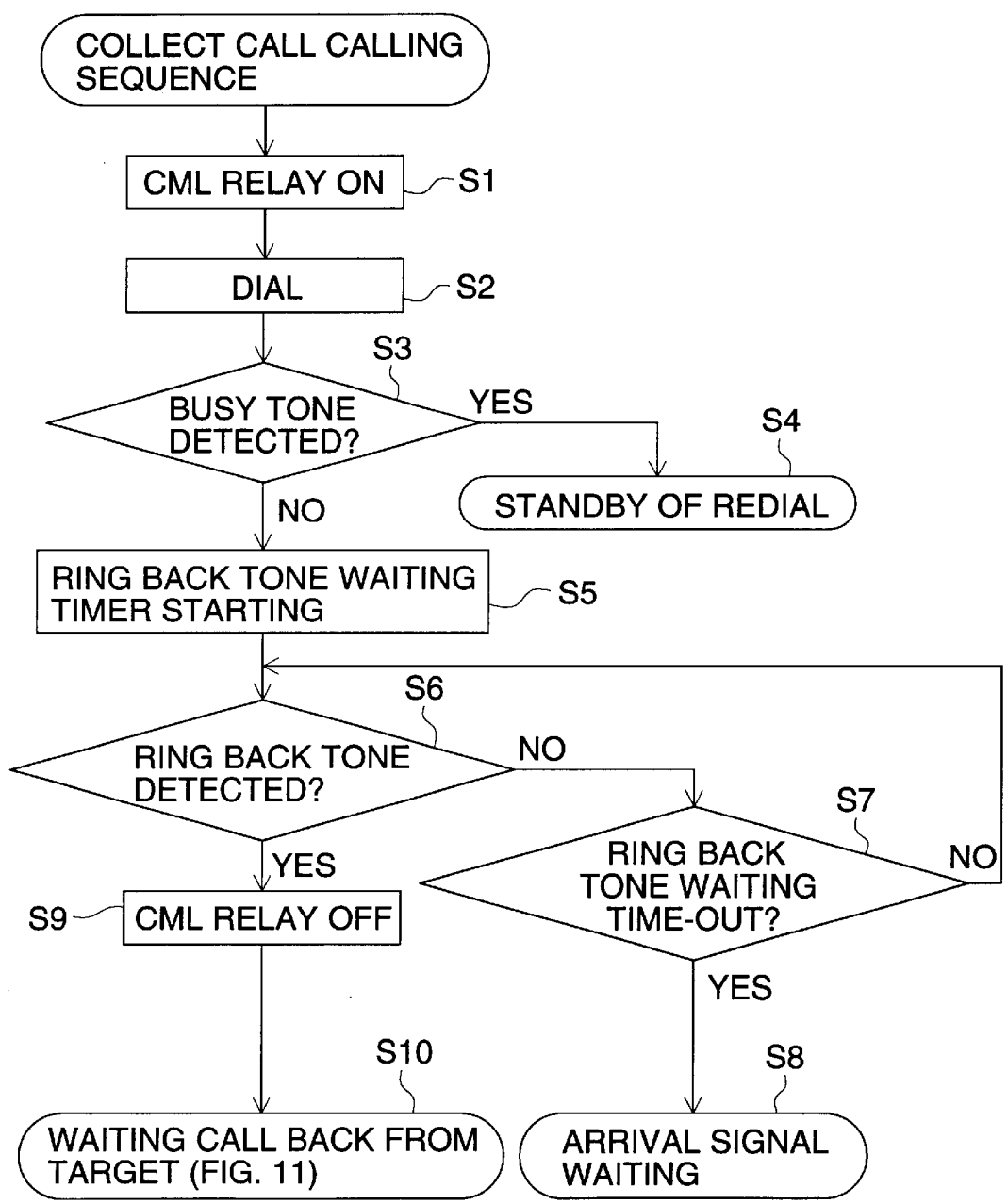
FIG. 10 is a flow chart showing an example of a sequence for collect call calling.

When making a calling through an abbreviated dial, CPU 4 refers to calling mode setting section 34 of telephone number registration memory 30. When registered data is "0", normal calling mode is executed (S4), while when registered data is "1", collect call calling shown in FIG. 10 is executed (S6: stated in detail later). In the case of calling through an abbreviated dial, a telephone number of telephone number section 32 corresponding to abbreviated number section 31 in the telephone number registration memory 30 is supposed to be dialed. For example, when the abbreviated number is 2, telephone number "0011223" is dialed.

In the present embodiment, it is possible to make a call back mode to be executed momentarily by providing in the communication control unit a push button switch which can select a collect call mode only once, and by operating the push button switch.

FIG. 10 is a flow chart showing an example of a sequence for collect call calling. CPU 4 turns on a CML relay first to connect lines (S1). Then, it dials to a target (S2). After that, CPU 4 enters processing to detect a busy tone (S3). When the busy tone is detected, the calling is released once to enter the state of standby for redialing (S4).

When the busy tone is not detected, CPU 4 starts a ring back tone waiting timer (S5). This ring back tone waiting timer can be realized either by a hardware or by a software. Next, CPU 4 checks whether the ring back tone is detected or not (S6).

When time runs out on a ring back tone waiting timer in the case where a ring back tone is not detected, the called is once released to enter the state of waiting redialing (S8). When a ring back tone is detected, a CML relay is turned off to disconnect lines (S9) to enter the state of waiting call back from a target shown in FIG. 11 (S11: details are explained in later).

Figure 11:
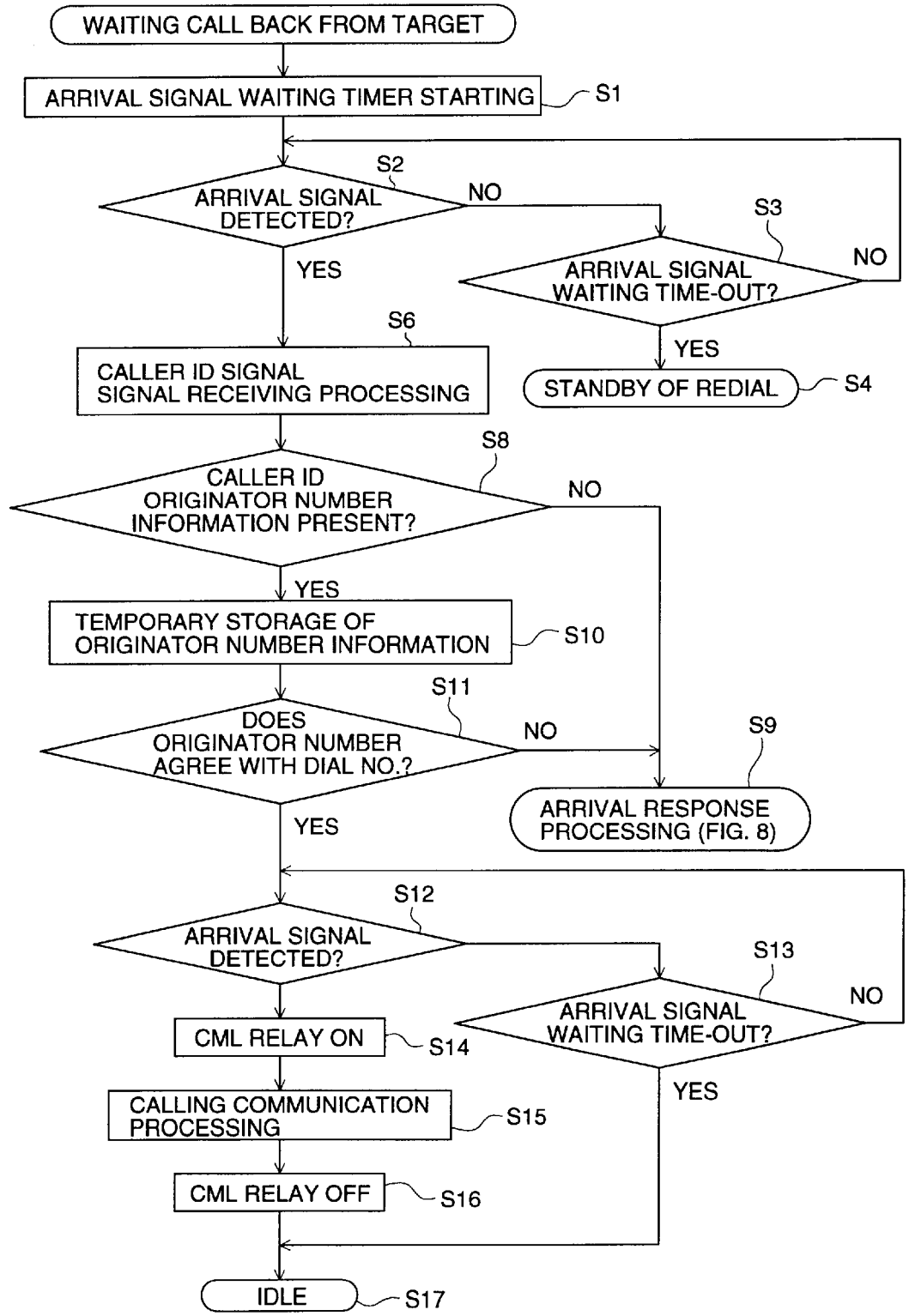
FIG. 11 is a flow chart showing an example of a sequence for waiting call back after collect call calling.

FIG. 11 is a flow chart showing an example of a sequence for waiting call back after collect call calling. This sequence is one to wait arrival signals of call back from a target after calling for a collect call. The calling for collect call in this case is a calling sequence expecting call back from a target after calling operations, and it is a sequence to disconnect lines once at the moment when a ring back tone is confirmed after conducting dialing, and to wait arrival signals caused by call back from a target machine.

First, CPU 4 starts an arrival signal waiting timer (S1). This arrival signal waiting timer can be realized either by a hardware or by a software. Next, CPU 4 enters arrival signal detection operations (S2). When time runs out on the arrival signal waiting timer before arrival signals are detected (S3), the state enters that of waiting redialing (S4).

When arrival signals are detected, a CML relay is turned on to connect lines (S5), and to enter the processing for receiving caller ID signals (S6). This processing for receiving caller ID signals confirms an originator number and a dial number of a target unit. After completion of the processing for receiving caller ID signals, the CML relay is turned off temporarily to disconnect lines (S7).

Next, CPU 4 checks whether an originator number is included in the caller ID or not (S8). When the originator number is not included, the sequence enters ordinary arrival response processing shown in FIG. 8 (S9). When the originator number is included, the originator number is stored in RAM 6 temporarily (S10).

Next, CPU 4 checks whether the sent originator number agrees with a dial number which was dialed in a collect call calling mode in FIG. 10 or not (S11). When they do not agree with each other, ordinary arrival response processing shown in FIG. 8 is conducted (S9).

When they agree with each other, the sequence enters next the detection of arrival signals coming from a target (S12). In this case, when time runs out on the arrival signal waiting timer while waiting the arrival signal (S13), the sequence goes to the initialization state (idle state) (S17). When the arrival signals is detected, CPU 4 turns on a CML relay to connect lines (S14), and conducts operations of communication processing on the part of a calling station (S15).

Figure 12:
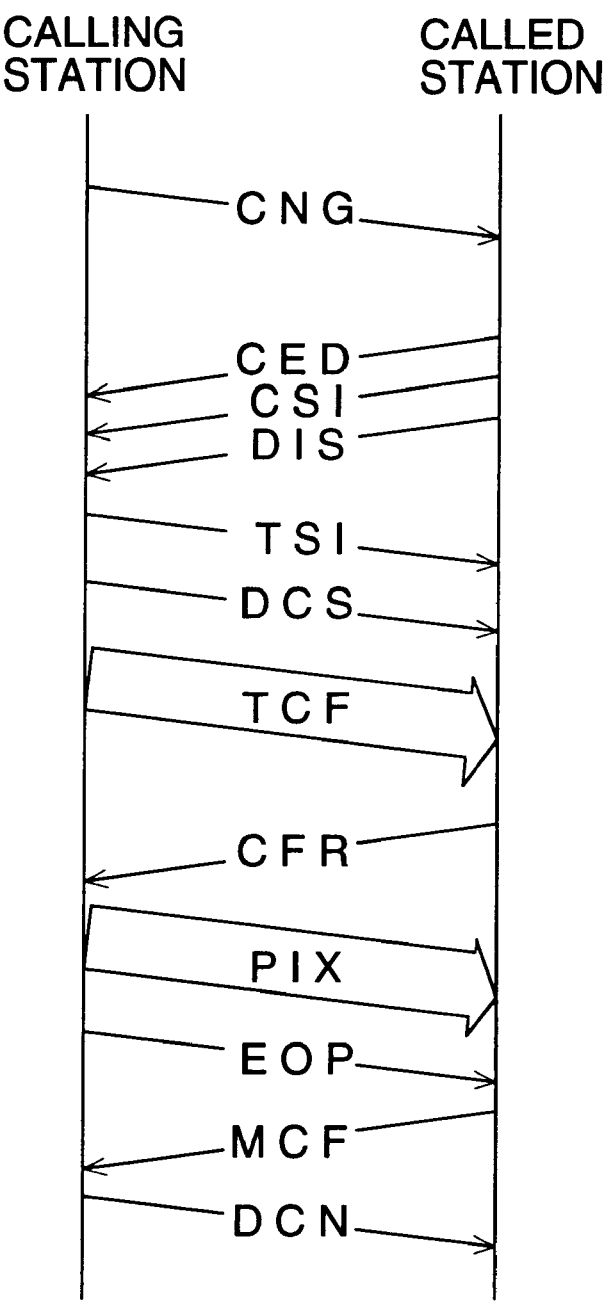
FIG. 12 is a diagram showing an example of communication procedures for transmission of a single page.

In the course of the operations of the call communication processing, transmission of facsimile information is conducted between communication control units (see FIG. 12). After completion of the operations of the call communication processing, CPU 4 turns off the CML relay (S16) and enters the initialization state (S17).

Due to the present embodiment wherein it is checked that whether or not arrival signals come within a prescribed period of time after detection of a ring tone, then when the arrival signals come, communication is started in the communication procedures in the calling when the originator number agrees with the number dialed, while communication is conducted in the communication procedures in the called when the originator number does not agree with the number dialed, it is possible to perform optimum communication operations in the calling.

FIG. 12 is a dial showing an example of communication procedures for transmission of one page in a facsimile telegraph. Operation procedures in accordance with an ITU-T30 recommendation between a calling station and a called station are shown. When a call ton e (CNG) is transmitted from a calling station to a called station, the called station sends called station discrimination signal (CED) to respond the foregoing. Further, the called station sends the called terminal discrimination number (CSI) to the calling station, and sends digital discrimination signal (DIS).

For the foregoing, the calling station sends transmission terminal discrimination signal (TSI) to the called station, and sends digital command signal (DCS). Next, training check signal (TCF) is sent from the calling station to the called station.

The called station receives TCF signal and sends receiving preparation confirmation signal (CFR) to the calling station. Upon receiving of the CFR signal, the calling station sends image data (PIX). After completion of the sending of the image data, the calling station sends procedure completion signal (EOP) to the called station.

The called station which has received the EOP signal sends message confirmation signal (MCF) to the calling station which receives the message confirmation signal and then sends disconnection command (DCN) to the called station. Due to this, processing of data transmission for one page is completed.

Figure 13:
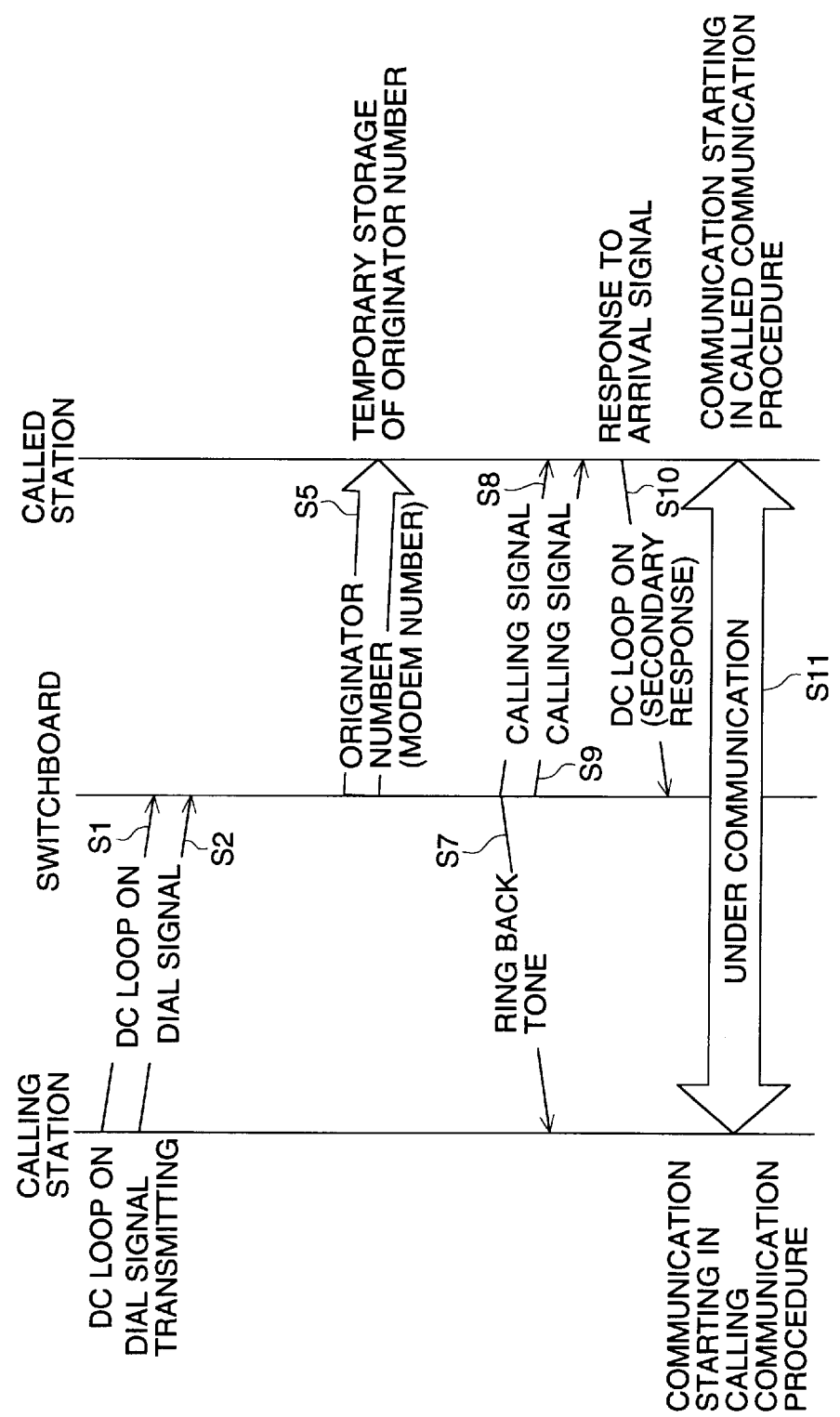
FIG. 13 is a diagram showing an example of a sequence for responding to arrival after receiving caller ID signals.

FIG. 13 is a diagram showing an example of a sequence for responding to arrival after receiving caller ID signals. The diagram shows communication among a calling station, a switchboard and a called station. The calling station closes a CML relay for the switchboard to turn on a DC loop (S1), and then sends dial signals (S2).

The switchboard sends the originator number (modem signal) to the called station (S5). Then, the called station demodulates the received modem signals and extracts the originator number which is stored temporarily in storage memory (RAM) 6.

The switchboard sends a ring back tone to the calling station (S7). In the calling station, modem signals from a target are waited. Simultaneously with this, the switchboard sends calling signals to the called station (S8, S9). In the called station, a DC loop is turned on (secondary response) by turning on the CML relay with response to arrival signals. Due to this, the calling station and the called station are connected to each other through the switchboard to conduct communication (S11). In this case, the calling station starts communication in accordance with call communication procedures, while the called station starts communication in accordance with called communication procedures.

Figure 14:
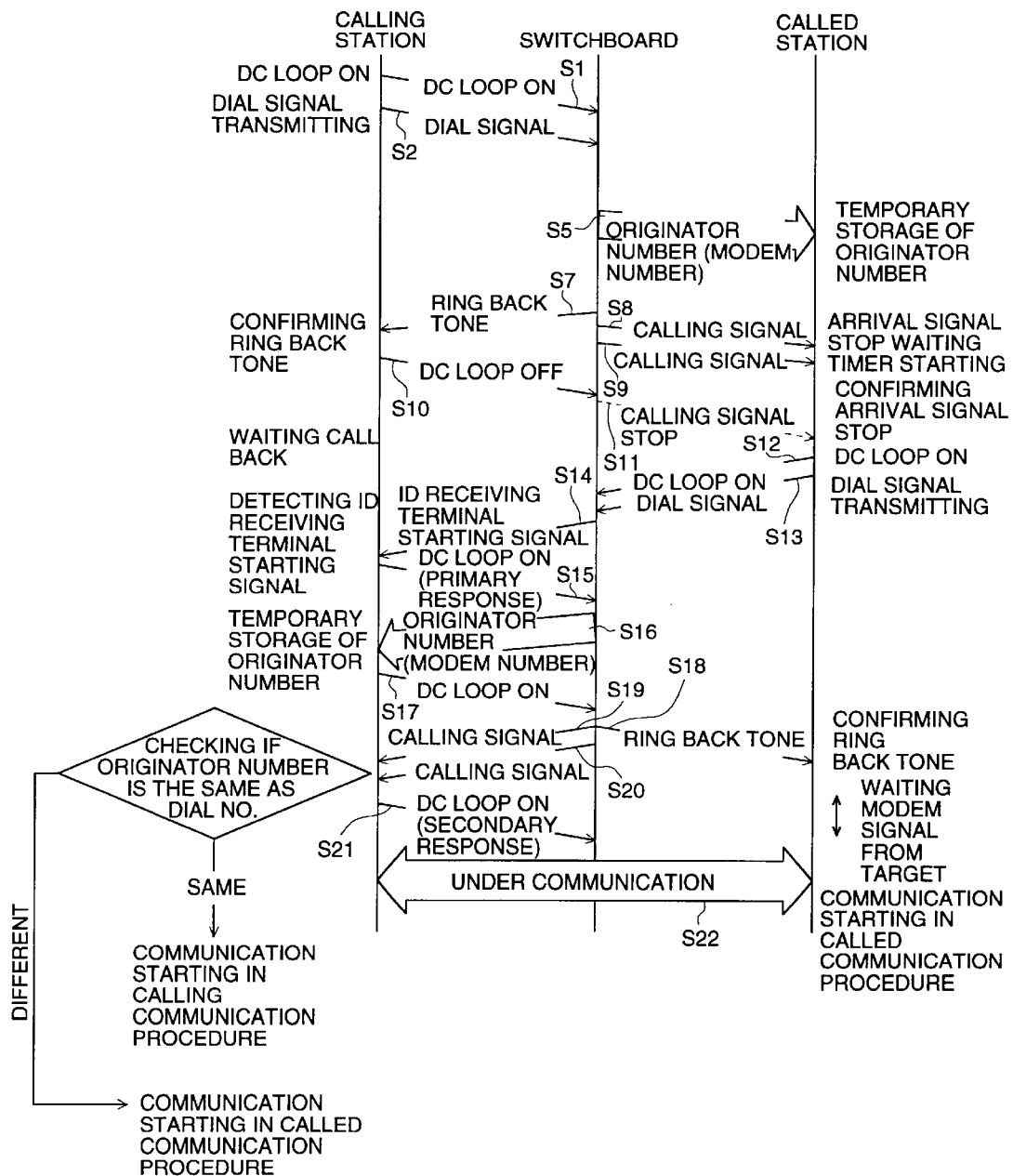
FIG. 14 is a diagram showing an example of a sequence of call back operations in the case of a collect call mode and a free dial mode.

FIG. 14 is a diagram showing an example of a sequence of call back operations in the case of a collect call mode and a free dial mode. The diagram shows communication among a calling station, a switchboard and a called station. The calling station turns on DC loop (S1), and sends dial signals to the switchboard (S2).

The switchboard sends the originator number (modem signal) to the called station (S5). Then, the called station demodulates the received modem signals and extracts the originator number which is stored temporarily in storage memory (RAM) 6. Next, the called station sends DC loop off signals to the switchboard (S6).

The switchboard sends a ring back tone to the calling station (S7). Next, the switchboard sends calling signals to the called station (S8, S9).

The calling station, after confirming the ring back tone, sends DC loop on signals to the switchboard (S10) to wait call back.

The called station, after receiving the calling signals, starts an arrival signal stop waiting timer. When the ring tone from the switchboard stops (S11), the called station confirms the arrival signal stop, and sends DC loop on signals to the switchboard (S12), and then sends dial signals (S13).

The switchboard, after receiving the dial signals, sends ID receiving terminal starting signals to the calling station (S14). Upon receiving of this signal, the calling station transmits DC loop on signal (primary response) to a switchboard (S15). For this primary response, the switchboard transmits the originator number (modem signal) to the calling station (S16). At the calling station, the signal received is demodulated and the originator number is stored temporarily in storage memory (RAM) 6.

Next, the calling station transmits a DC loop off signal to the switchboard (S17). Upon receiving of this signal, the switchboard notifies the called station of a ring back tone (S18), and the called station enters the state for waiting a modem signal from a target after confirming the ring back tone.

Simultaneously with S18, the switchboard transmits a calling signal to the calling station (S19, S20). Upon receiving of the calling signal, the calling station transmits a DC loop on signal (secondary response) to the switchboard (S21). After this, the calling station and the called station are connected by lines to conduct data communication (S22). In this case, the calling station checks whether the originator number is the same as the dial number transmitted in the step of (S2) or not, and when both are the same, communication is started in the calling communication procedure, while when both are not the same, communication is started in the called communication procedure.

In the communication between facsimile telegraphs, document information read by reading section 11 is compressed by compression/extension processing section 13, then is modulated by modem 3 and is transmitted from NCU 2 to a target station through public lines 2. In the facsimile telegraph at the target, document information thus transmitted is received by NCU 2, then is modulated by modem 3, and is recorded on a recording sheet at recording section 12 after being extended by the compression/extension processing section 13.

In the embodiment explained above, it is possible to select freely at any time whether to call back all targets whose originator numbers are sent or to call back only the specific target registered in the terminal, by the setting on the part of the communication control unit (terminal). Therefore, it is possible to determine who should bear the communication charge. Further, the call back sequence is conducted automatically, and no burden is imposed on an operator.

In the embodiment stated above, though a facsimile telegraph is used as a communication control unit (communication terminal), the invention is not limited to this, and can be applied to other communication control units.

As stated in detail above, the above embodiment makes it possible to obtain the following effect.

(1) A communication control unit provided therein with a network connection unit which connects with public lines, a caller ID receiving processing section which receives caller (CALLER) ID signals sent from public lines through the network connection unit and extracts caller ID data, a memory section which temporarily stores caller ID extracted data extracted by the caller ID receiving processing section, a telephone number registration memory section in which plural telephone numbers and response modes for them are registered, wherein there is provided a call back function which receives caller ID signals conducting primary response to an arrival, starts communication responding to the arrival for arrival signals after the primary response when an originator number is not sent by the caller ID signals, stores temporarily an originator number when an originator number is sent by the caller ID signals, and does not respond to the arrival signals after the primary response, and dials back the originator number again by judging that the arrival signals have been stopped at the point when the arrival signals have not been detected for the prescribed period of time, which makes it possible to realize a call back function wherein caller ID signals are received and are judged whether or not an originator number is included in the signals and thereby either an ordinary response for arrival is conducted or the originator number is called back depending on the results of the judgment, which further makes it possible to realize both a free dial function and a collect call function on a communication terminal.

(2) Further, a normal mode which conducts automatic response independently of the originator number, a free dial mode which conducts call back actions unconditionally when an originator number is sent by caller ID signals, and a collect call mode which checks whether or not an originator number is registered on a telephone number registration memory section in its own station when the originator number is sent by caller ID signals and conducts call back only when the originator number is registered and a mode for responding after being called is set to call back, are provided, which makes it possible to select response of an arbitrary mode in advance by providing a normal mode, a free dial mode and a collect call mode as an automatic response mode in the case of being called.

(3) It is possible to register plural area codes as telephone numbers executing call back actions in the case of the free dial mode, and an area code of an originator number sent by caller ID signals is compared with plural area codes registered for call back use, and call back actions are executed only when both area codes agree with each other, which makes it possible to execute call back actions only when an area code of an originator number sent and an area code registered in advance agree with each other, and thereby to execute call back actions only for calling from a target having a specific area code.

(4) In the case of calling for the call back actions stated above, a ring back toner is detected, and when the ring back tone is detected, a ring tone which is different from an ordinary ring tone is rung to indicate the call back actions, and then the ring tone is stopped after confirming procedure signals from s target machine, which makes it possible to confirm the call back actions by detecting that the ring back tone is different from an ordinary ring tone.

(5) In the case of calling, a ring tone sent from a switchboard after dialing is detected, and after the ring tone is confirmed, arrival signals by means of call back from a target are waited for a prescribed period time after lines are released, and when the arrival signals do not come within the prescribed period time, a target machine is judged not to receive the call back, and a communication procedure for an ordinary call to execute redialing and to wait procedure signals from the target machine is started, while when the arrival signals come within the prescribed period of time, an originator number is checked by receiving caller ID signals through the primary response to the arrival, and when the originator number agrees with a dial number dialed, the call back is judged to have been executed, and communication is started, after the response for the called, with communication procedures at the moment of calling, while when the originator number does not agree with the dial number, communication is started, after the response for the called, with communication procedures at the moment of the called, which makes it possible to conduct communication operations which are optimum in calling, by judging whether or not arrival signals come within the prescribed period of time, after detection of a ring tone, then by starting communication with communication procedures at the moment of calling when the arrival signals come and the originator number agrees with the number dialed, and by communicating with communication procedures at the moment of called when the originator number does not agree with the number dialed.

(6) There is further executed a calling mode which expects call back temporarily for only one communication, by providing a mechanism wherein there is provided a switch which selects either a calling mode expecting call back or an ordinary calling mode, and the calling mode expecting call back is returned automatically to its original state after executing communication with the calling mode expecting call back, which makes it possible to execute call back temporarily by operating a selection switch.

As stated above, the invention makes it possible to provide a communication control unit capable of realizing both a free dial function and a collect call function in the communication terminal, by using caller ID signals.

What is claimed is:

1. A communication control unit, comprising:
   a network connection unit to connect public lines in response to an arrival signal sent from a caller;
   communicating means for communicating with the caller through the network connection unit;
   caller ID receiving means to receive caller ID signals of the caller sent from the public lines through the network connection unit;

control means for judging whether a telephone number of the caller is included in the caller ID signals;

wherein the communicating means starts communicating with the caller when the control means judges that the telephone number of the caller is not included in the caller ID signals, and calls back the telephone number of the caller when the control means judges that the telephone number of the caller is included in the caller ID signals, and wherein in the case that the communication control unit acts as a calling station to call a target station, when a ring tone sent from a switchboard is detected after calling the target station, arrival signals by means of a call back from the target station are waited for a prescribed period of time after lines are disconnected once, and thereafter, when the arrival signals do not come from the target station within the prescribed period of time, the control means judges that the target station does not accept a request for a call back and the communicating means conducts an ordinary call to execute redialing to the target station.

2. The communication control unit of claim 1, wherein the network connection unit disconnects the public lines from the caller after the caller ID receiving means receives the caller ID signals of the caller.

3. The communication control unit of claim 2, wherein when the telephone number of the caller is not included in the caller ID signals, the network connection unit connects again the public lines with the caller in response to a next arrival signal from the caller and the communicating means starts communicating with the caller.

4. The communication control unit of claim 2, wherein when the telephone number of the caller is included in the caller ID signals, the communicating means calls back the telephone number of the caller after a next arrival signal is not sent from the caller for a predetermined time.

5. The communication control unit of claim 1, wherein if a ring-back tone from the caller is detected when the communicating means calls back the telephone number of the caller, the communicating means rings a different sound from that of a regular call so that the calling back is notified, and stops the ring-back tone after a signal is sent from the caller.

6. The communication control unit of claim 1, wherein the control means controls the communicating means so as to conduct one of plural automatic response modes including a regular response mode, a free-dial mode and a collect call mode.

7. The communication control unit of claim 1, wherein in the case of the regular response mode, the communicating means starts communicating with the caller regardless of whether the telephone number of the caller is included in the caller ID signals.

8. The communication control unit of claim 1, wherein in the case of the free-dial mode, when the telephone number of the caller is included in the caller ID signals, the communicating means calls back the telephone number of the caller regardless of whether the telephone number of the caller is registered.

9. The communication control unit of claim 8, wherein the control means comprises an area memory section to register plural area codes, and wherein in the case of the free-dial mode, the control means compares the area code of the telephone number of the caller with the area codes registered in the area memory section, the communicating means calls back the telephone number of the caller when the area code of the telephone number of the caller is registered in the area memory.

10. The communication control unit of claim 2, wherein the control means comprises a telephone number registration memory section to register plural callers, wherein each caller is registered together with a telephone number of the caller and a personal response mode for the caller.

11. The communication control unit of claim 9, wherein in the case of the collect call mode, the control means compares the telephone number of the caller with the telephone numbers registered in the telephone number registration memory section, and the communicating means calls back the telephone number of the caller when the telephone number of the caller is registered in the telephone number registration memory section and the personal response mode is the call back mode.

12. The communication control unit of claim 1, wherein the control means has a memory to store caller ID data corresponding to the caller ID signals and a central processing unit.

13. The communication control unit of claim 1, wherein when the arrival signals come within the prescribed period of time, a telephone number is checked by receiving caller ID signals, and when the telephone number agrees with a telephone number of the target station, the call back is judged to have been executed, and communication is started.

14. The communication control unit of claim 1, further comprising: a calling mode which expects call back temporarily for only one communication, by providing a mechanism wherein there is provided a switch which selects either a calling mode expecting call back or an ordinary calling mode, and the calling mode expecting call back is returned automatically to its original state after executing communication with the calling mode expecting call back.

15. A communication control unit, comprising:

a network connection unit to connect public lines in response to an arrival signal sent from a caller;

communicating means for communicating with the caller through the network connection unit;

caller ID receiving means to receive caller ID signals of the caller sent from the public lines through the network connection unit;

control means for judging whether a telephone number of the caller is included in the caller ID signals;

wherein the communicating means starts communicating with the caller when the control means judges that the telephone number of the caller is not included in the caller ID signals, and calls back the telephone number of the caller when the control means judges that the telephone number of the caller is included in the caller ID signals, and wherein in the case that the communication control unit acts as a calling station to call a target station, when a ring tone sent from a switchboard is detected after calling the target station, arrival signals by means of a call back from the target station are waited for a prescribed period of time after lines are disconnected once, and thereafter, when the arrival signals come from the target station within the prescribed period of time, a telephone number is checked by receiving caller ID signals, and when the received telephone number agrees with a telephone number of the target station, the control means judges that the target station accepts a request for a call back, and the communicating means conducts communication through the call back.

* * * * *